May 2, 1933.  S. W. PARSONS ET AL  1,906,714
CHUCK
Filed Sept. 17, 1930
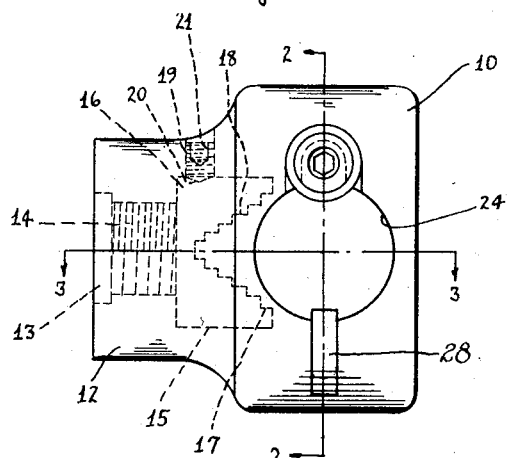
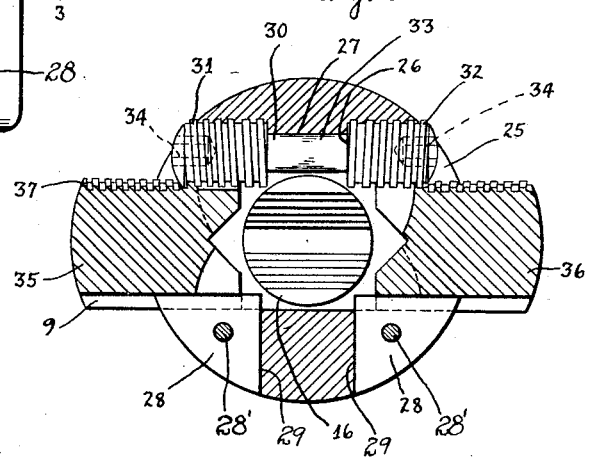
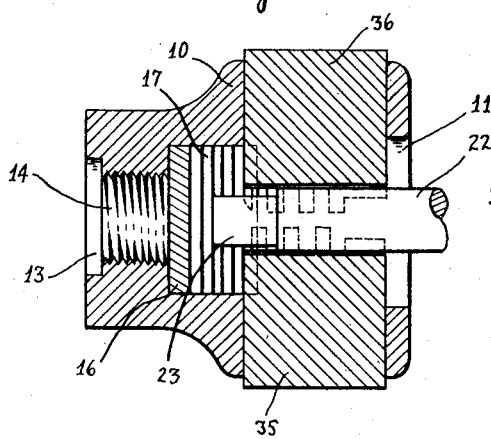
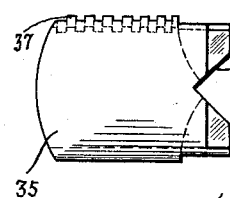
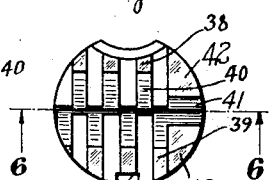
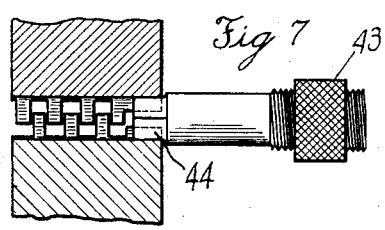
Inventor
Stuart W. Parsons
Gustave R. Dahlman
By *N. Clay Lindsey*
Attorney Patented May 2, 1933

1,906,714

UNITED STATES PATENT OFFICE

STUART W. PARSONS AND GUSTAVE R. DAHLMAN, OF NEW BRITAIN, CONNECTICUT, ASSIGNORS TO THE SKINNER CHUCK COMPANY, OF NEW BRITAIN, CONNECTICUT, A CORPORATION OF CONNECTICUT

CHUCK

Application filed September 17, 1930. Serial No. 482,404.

This invention relates broadly to the art of chucks, and is more particularly concerned with that type of chuck wherein jaws are movable to grip a tool shank or the like. The conditions under which a chuck is used require that the chuck grip a tool shank for rotative purposes, as is well evidenced in the art in that tool shanks are often provided at their ends with a non-circular or square portion which is received in, and engaged by, the chuck. It is desirable that the shank, in addition to being positively held against rotation in the chuck, be supported in a positive and rigid manner in order that it is properly centered and well steadied against lateral or wobbling movement to effect a more accurate operation.

Bearing the foregoing in mind, this invention has, as an important object, the provision of a chuck including jaw elements which are movable to grip the rounded portion of a tool shank, and which also includes means independent of the jaw elements for engaging with the squared end of the tool shank to prevent rotation of the latter. More particularly, the main body of the chuck is formed with shoulders which engage with the flat surfaces of the squared end to inhibit the turning movement. In carrying out this thought in a practical embodiment, the chuck is provided with a socket in which is seated a block formed with a pair of complemental steps which imparts to the chuck head the capability of accommodating and holding the squared end of tool shanks of varying sizes.

A further aim of the invention is to provide a chuck of the character described which is more or less universal in its nature in that it is adapted to hold tool shanks of various construction, sizes and shapes. More particularly, the arrangement is such that a tool having a shank of sufficient length may be held at the squared end in said socket and supported at its round portion between the jaw faces of said movable jaws, and a tool, such as a reamer, having an adjustable feature so located that the shank cannot be positioned between the jaws with the squared end in the socket, may be securely held by the movable jaws themselves gripping or holding the short squared end of the shank.

Ordinarily the jaw elements of the chuck are operatively mounted in the head and suitable means are provided for operating the jaw elements. Heretofore it has been the practice to also avail of this operating means as the means for preventing rotative movement of the jaw elements in the head. This practice is accompanied with certain manufacturing disadvantages in that the parts must be very accurately machined, and is therefore departed from by the present invention which provides separate means for preventing this relative turning movement on the part of the jaw elements. In the present embodiment, the jaw elements are provided with grooves which receive spline members projecting inwardly from the head and into the grooves in the jaws whereby relative lateral or radial movement of the jaw elements is permitted, while turning movement is prevented. These spline members are of novel and simple construction, which permits their embodiment in the chuck head at a relatively low cost.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein we have shown, for illustrative purposes, one embodiment which the present invention may take, Fig. 1 is a view in side elevation of a chuck embodying the improvements of this invention;

Fig. 2 is a section of the chuck shown in Fig. 1. This view is taken about on the plane represented by the line 2—2 of Fig. 1;

Fig. 3 is a section taken at right angles to the showing of Fig. 1. This view is taken about on the plane indicated by the line 3—3 of Fig. 1;

Fig. 4 is a view in side elevation of one of the jaw elements per se;

Fig. 5 is a view in end elevation of the jaw element shown in Fig. 4;

Fig. 6 is a view of the jaw element in longitudinal section, this view being taken on line 6—6 of Fig. 5; and Fig. 7 is a detailed view showing the manner in which a tool having a relatively short, round shank is held between the radially movable jaws themselves.

Referring now to the drawing, the main body or head of a chuck is designated 10. This head may be of a cylindrical formation as shown and is provided with an opening 11 which extends axially through the cylindrical portion of the head 10. The latter is reduced at one end as indicated at 12, and this reduced portion is provided with a bore 13 which is threaded as indicated at 14 so as to provide means for operatively mounting the chuck on the spindle of a machine, such as a reamer, lathe, or other similar mechanism. It is to be understood that the chuck head may, of course, be mounted in any other approved manner, the illustrated construction being merely one method of accomplishing this end.

The opening 11 terminates in a socket 15 which extends into the reduced portion 12. Detachably mounted in the socket 15 is a block 16 which is provided with two series of steps indicated at 17 and 18. The block 16 is held in position in the socket 15 by a screw, designated 19, having a pointed end, as shown at 20, and which is spotted in a complemental opening in the block 16. Any suitable means for operating the screw plug may be availed of, such as the non-circular opening shown at 21. The series of steps 17 and 18 are of duplicate construction and the plane surfaces constituting each series of steps are either in alignment with, or parallel to, the corresponding plane surfaces of the other series. Moreover, the steps are disposed at a substantially right angular relationship with respect to one another. In other words, the front face of the block 16 has a ninety degree V-groove the sides of which are correspondingly stepped so as to provide a plurality of pairs of opposed shoulders the planes of which are parallel to the axis of the chuck, and the successive pairs of shoulders are spaced at successively greater distances from the center of the chuck.

The tool shank shown in Fig. 3 and having a cylindrical portion 22 and a squared end 23 is typical of a tool shank which is intended to be gripped by the chuck hereof. When the shank is properly positioned in the chuck head, the squared end 23 will be seated in, and engaged by, the stepped arrangement 17 and 18 on the block 16. The plane surfaces which are perpendicular to the axis of the head partially engage the end surface of the shank, while the plane surfaces which are parallel to the axis of the head engage the sides of the squared end in an obvious manner. The stepped arrangement provided imparts to the chuck the capability of accommodating tool shanks of various sizes. The mere insertion of the shank in the head will insure the engaging of the squared end with the perpendicular plane surfaces of the stepped arrangement.

The head 10 is provided with an opening 24 which extends diametrically across the head in a transverse direction with respect to the opening 11. A second smaller opening or hole 25 extends chordally across the head 10 and communicates with the opening 24. Intermediate the ends of the opening 25, the head is formed with a rib 26 which provides a surface 27 that constitutes a journal, as will be hereinafter pointed out in detail.

A screw member, designated generally 30, is located in the opening 25 and has screw sections 31 and 32 at its opposite ends and an intermediate reduced portion 33 which is journaled on the surface 27. The reduced construction between the screw sections 31 and 32 provides shoulders which straddle the rib 26 whereby the screw member 30 is maintained in proper position in the head. The threads on the sections 31 and 32 are respectively left and right handed. The screw member 30 may be provided at each end with any preferred type of wrench engaging means such as a non-circular socket shown at 34.

A pair of jaw elements 35 and 36 are operatively mounted in the opening 24 and are attached to move radially therein into and out of gripping engagement with the rounded portion 22 of the tool shank. These jaw elements 35 and 36 are of duplicate construction and each comprises a generally cylindrical member provided at one side with a panel 37 curved correspondingly to the screw sections 31 and 32 and having teeth or thread sections corresponding to, and adapted to cooperate with, the threads on said screw member. Heretofore it has been customary to rely upon the interlock set up by the engagement between the screw member 30 and the panels on the jaw elements for preventing rotation of the jaw elements in the chuck head. This practice is attended with certain disadvantages, including the necessity of machining the parts with a very high degree of accuracy in order that they closely fit while permitting movement therebetween, and not infrequently the jaws become cramped and not easily operable. In accordance with the present invention, the screw member is relieved, to a large extent, of the function of preventing rotation of the jaw members, and to this end there is provided a spline and groove arrangement between the jaws and the chuck head. This spline arrangement insures correct alignment of the parts, gives a smooth and easier action, eliminates cramping of the jaws, and lessens somewhat the accuracy with which the jaws and screw are made and interfitted. In the present instance, this improved arrangement includes a longitudinally extending groove 9 in each jaw element diametrically opposite the thread panel 37 thereof, and keys 28 carried by the chuck head and engaging in the respective grooves of the jaws.

The keys 28 are located in slots 29 cut in the chuck head at the ends of the opening 24 and diametrically opposite to the screw member 30. These slots are preferably formed by milling them with a cutter, an operation which may be easily and quickly effected. The keys are in the form of sectors. One straight edge of each key projects into the opening 24, and the peripheral edge of each is curved correspondingly to, so as to register with, the external periphery of the chuck body. The other edge of each sector engages against the bottom of the respective slot 29. In Fig. 1, the edges of the key are illustrated more or less prominently in order to show the structure, but in actual practice these edges will hardly be perceptible as the curved surface of the key is aligned with, and merges into, the curved periphery of the chuck body. The keys may be secured in place by cross pins 28'.

Each of the jaw elements is provided, on its inner end, with two series of ribs, preferably arranged in staggered relation. The inner or opposed surfaces of the ribs are relatively inclined so as to provide, in effect, a pair of jaw faces which are at right angular relationship with respect to one another. In the drawing, the ribs of one series are designated by the numeral 38, and those of the other series by the numeral 39. The inclined and opposed surfaces of these ribs are indicated by the numeral 40. The surfaces 40 on each series of ribs are at an angle of forty-five degrees with respect to the axis of the jaw element, which means that the angle between the opposed surfaces is ninety degrees. When a tool having an unobstructed round shank, such as shown in Fig. 3, is to be gripped, the faces 40 of the ribs engage and rigidly hold the round portion of the shank, while the stepped arrangement 17 and 18 engages the squared portion of the shank and prevents rotation of the shank while it is being held in the head.

In order to increase the range of utility of the structure described and adapt it for use in connection with tools of various kinds and sizes, the staggered arrangement of the ribs 38 and 39 terminates short of the forward edge of the jaw faces of the elements, and adjacent these forward edges there is provided a V-shaped groove having at each side an unbroken face 41, the faces being disposed at ninety degrees to one another. In effect, these faces 41 of the V-groove are provided on the opposed faces of projections 42 directly opposed and located forwardly of and of lesser height than the staggered ribs 38 and 39. With this arrangement, a tool shank such as shown in Fig. 7 may be secured in the chuck. That shank may comprise the end of a reamer of a well known sort having adjustable blades which are adapted to be adjusted or locked in position by a knurled nut 43 threaded onto the shank. Ordinarily, the distance between this knurled nut and the squared end 44 of the shank is not sufficiently great to permit the jaws to engage the round shank rearwardly of the nut when the squared end is engaged with the stepped block. In such instances, the squared end of the shank may be engaged and securely held against turning movement by gripping it between the jaw surfaces 41, as illustrated in Fig. 7.

Briefly outlining the mode of operation of the foregoing construction, when a tool having a shank, such as shown in Fig. 3, is to be secured in place, the screw element is rotated to separate the jaw elements sufficiently to permit of ready insertion of the tool shank. The squared end of the latter is now inserted through the opening 11 and the jaw elements, and is engaged with the proper plane surfaces of the steps 17 and 18. The screw member 30 is now rotated in the proper direction by appropriate wrench means, whereupon the jaw elements are moved inwardly to cause the ribs 38 and 39 on the jaw faces to grip the round portion of the shank. The shank is now held securely against turning movement by the engagement of a squared portion in the block 16, and is securely held against lateral and wobbling movement by the opposed jaws 35 and 36. When the tool is of such construction that its shank cannot be engaged as just described, as when the shank has a nut 43 located as shown in Fig. 7, the squared end of the shank is engaged between the gripping surfaces at the forward ends of the jaw faces and is held thereby against rotary movement relative to the chuck body.

In devising the foregoing chuck assembly, simplicity of construction, reliability, and positiveness of operation, as well as ease and economy of manufacture, have been paramount features which were borne in mind and which controlled the designing of this chuck mechanism. The arrangement of the jaw elements in the head insures easy, accurate, and positive operation of the jaw elements in the head under the influence of the screw member 30, while construction of the jaw faces makes certain of a good gripping engagement with the rounded portion of the tool shank in one instance, or with the squared end of the shank, in the other instance. By providing plane surfaces in the head proper for engaging with the corresponding flat of the tool shank, rotation between the head and shank is prevented. The chuck mechanism is compact, relatively light in weight, and is capable of holding a variety of tools for general purposes.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. In a chuck of the character described, a head having an axial opening and a cylindrical opening transverse to said first mentioned opening, the head also having a cylindrical hole parallel to and communicating with the transverse opening, generally cylindrical jaws radially movable in said transverse opening and having thread panels, a round screw member in said hole having screw sections engaging said panels, means for operating the screw member, each jaw having a longitudinal groove formed therein, said head having at each end of said transverse opening a slot extending from the periphery of said head to the wall of said transverse opening, and a key secured in each slot, each key having an edge projecting into said transverse opening and received by one of said grooves, the outer faces of said keys being curved corresponding to and being flush with the peripheral face of said head.

2. A chuck of the character described comprising a rotatable chuck head, a pair of aligned jaw elements radially movable in the head, the inner end of each jaw element having two series of ribs disposed on opposite sides of the transverse center of said end, the ribs of one series being staggered with respect to the ribs of the other series, the opposed faces of said ribs being oppositely inclined, said staggered ribs terminating short of the forward edge of the jaw faces, the inner end of each of said elements forwardly of said staggered ribs having projections directly opposed and of lesser height than the staggered ribs, the opposed faces of said projections being inclined relative to one another and forming a V-groove.

3. A chuck adapted to receive bits of various sizes, comprising a rotatable chuck head, a pair of aligned jaw elements radially movable in the head, the inner end of each jaw element having series of ribs disposed on opposite sides of the transverse center of said end, the opposed faces of said ribs being oppositely inclined, the inner end of each of said elements forwardly of said ribs having projections directly opposed and of lesser height than the ribs, said chuck head having a socket inwardly of said jaw elements, and a block secured in said socket, the outer face of said block being recessed with two series of opposed steps therein providing plane surfaces at different radial distances from the axis of the head and adapted to engage the square ends of tool shanks.

4. A chuck adapted to receive bits of various sizes, comprising a head having an axial opening and a cross opening transverse to the axial opening, generally cylindrical jaws radially movable in said transverse opening and having thread panels, a round screw member mounted in the head having opposed screw sections engaging said panels, each jaw having a longitudinal groove formed therein, a key mounted in the head at each end of the transverse opening and engaging in the groove of the adjacent jaw, said head having a socket at the inner end of said axial opening beyond the jaws, a block secured in said socket and having a diametrically extending groove with inclined walls which are stepped to provide plane surfaces at different radial distances from the axis of the head to engage the square ends of tool shanks.

STUART W. PARSONS.
GUSTAVE R. DAHLMAN.